United States Patent
Sikka (10) Patent No.: US 12,026,474 B2
(45) Date of Patent: Jul. 2, 2024

(54) TECHNIQUES FOR GENERATING NATURAL LANGUAGE DESCRIPTIONS OF NEURAL NETWORKS

(71) Applicant: VIANAI SYSTEMS, INC., Palo Alto, CA (US)

(72) Inventor: Vishal Inder Sikka, Los Altos Hills, CA (US)

(73) Assignee: Vianai Systems, Inc., Palo Alto, CA (US)

( * ) Notice: Subject to any disclaimer, the term of this patent is extended or adjusted under 35 U.S.C. 154(b) by 338 days.

(21) Appl. No.: 17/376,086

(22) Filed: Jul. 14, 2021

(65) Prior Publication Data

US 2022/0019749 A1    Jan. 20, 2022

Related U.S. Application Data

(60) Provisional application No. 63/053,510, filed on Jul. 17, 2020.

(51) Int. Cl.
*G06F 40/40* (2020.01)
*G06N 3/045* (2023.01)
*G06N 3/08* (2023.01)

(52) U.S. Cl.
CPC ............. *G06F 40/40* (2020.01); *G06N 3/045* (2023.01); *G06N 3/08* (2013.01)

(58) Field of Classification Search
CPC .......... G06F 40/40; G06F 40/30; G06F 40/20; G06F 40/56; G06N 3/045; G06N 3/08; G06N 3/048; G06N 5/01; G06N 5/025
See application file for complete search history.

(56) References Cited

U.S. PATENT DOCUMENTS

2015/0206049 A1   7/2015   Canoy et al.
2021/0012209 A1   1/2021   Sikka et al.

FOREIGN PATENT DOCUMENTS

JP   2013-254451 A   12/2013
JP   2017-509952 A   4/2017
JP   2019-008778 A   1/2019

OTHER PUBLICATIONS

Ehsan et al. "Automated Rationale Generation: A Technique for Explainable AI and Its Effects on Human Perceptions", Mar. 17-20, 2019 https://www.arxiv-vanity.com/papers/1901.03729/ (Year: 2019).*

(Continued)

*Primary Examiner* — Yogeshkumar Patel
(74) *Attorney, Agent, or Firm* — Artegis Law Group, LLP (57) ABSTRACT

An artificial intelligence (AI) model includes one or more feature models coupled to one or more observer models in a hierarchical fashion. The feature models are configured to process an input to detect different features within that input. The observer models are configured to analyze the operation of the feature models during processing of the input to generate various types of observations. One type of observation includes a natural language expression that conveys how various architectural and/or functional characteristics of a given feature model influence the processing of the input to detect features, thereby exposing the underlying mechanisms via which the given feature model operates.

20 Claims, 6 Drawing Sheets

(56) References Cited

OTHER PUBLICATIONS

Lipton "The Mythos of Model Interpretability", Mar. 2017 https://arxiv.org/abs/1606.03490 (Year: 2017).*
International Search Report for application No. PCT/US2021/041880 dated Nov. 25, 2021.
Lipton, Zachary C., "The Mythos of Model Interpretability", Cornell University Library, arXiv:1606.03490, 2016 ICML Workshop on Human Interpretability in Machine Learning (WHI 2016), Jun. 10, 2016, 9 pages.
Ehsan et al., "Automated Rationale Generation: A Technique for Explainable AI and its Effects on Human Perceptions", https://doi.org/10.1145/3301275.3302316, Mar. 17-20, 2019, pp. 263-274.
Vaughan et al., "Explainable Neural Networks based on Additive Index Models", arXiv: 1806.01933, Jun. 5, 2018, 11 pages.
Arrieta et al., "Explainable Artificial Intelligence (XAI): Concepts, Taxonomies, Opportunities and Challenges toward Responsible AI", https://doi.org/10.1016/j.inffus.2019.12.012, Oct. 22, 2019, 74 pages.
Yong, Ed. "Neuroscientists Have Discovered a Phenomenon That They Can't Explain," The Atlantic, Jun. 9, 2021, available at https://www.theatlantic.com/science/archive/2021/06/the-brain-isnt-supposed-to-change-this-much/619145/, 10 pages.
Schoonover, C.E., Ohashi, S.N., Axel, R et al. Representational drift in primary olfactory cortex. Nature 594, 541-546 (2021), available at https://doi.org/10.1038/s41586-021-03628-7, Sep. 25, 2020 preprint version at https://www.biorxiv.org/content/10.1101/2020.09.24.312132v1, 75 pages.
Minsky, M. L. (1991). Logical Versus Analogical or Symbolic Versus Connectionist or Neat Versus Scruffy. AI Magazine, 12(2), 34, available at https://doi.org/10.1609/aimag.v12i2.894 or, https://ojs.aaai.org/index.php/aimagazine/article/view/894, 18 pages.

* cited by examiner

TECHNIQUES FOR GENERATING NATURAL LANGUAGE DESCRIPTIONS OF NEURAL NETWORKS

CROSS-REFERENCE TO RELATED APPLICATIONS

This application claims the priority benefit of the U.S. Provisional Application titled, "Technique for Generating Natural Language Descriptions of Neural Networks," filed on Jul. 17, 2020 and having Ser. No. 63/053,510. The subject matter of this related application is hereby incorporated herein by reference.

BACKGROUND

Field of the Various Embodiments

The various embodiments relate generally to computer science and artificial intelligence and, more specifically, to techniques for generating natural language descriptions of neural networks.

DESCRIPTION OF THE RELATED ART

In a conventional neural network design process, a designer writes program code to develop a neural network architecture that addresses a particular type of problem. The designer trains the neural network using training data in conjunction with target outputs that the neural network should produce when processing that training data. During the training process, a training algorithm updates weights included in the layers of the neural network to improve the degree to which the neural network generates outputs that are consistent with the target outputs. Once training is complete, the neural network is tested using validation data to determine the accuracy with which the neural network can generate target outputs associated with the validation data.

There is a diverse range of network architectures from which to choose when designing a neural network. A "deep" neural network generally has a complex network architecture that includes many different types of layers and an intricate topology of connections among the different layers. Some deep neural networks can have ten or more layers, where each layer can include hundreds or thousands of individual neurons and can be coupled to one or more other layers via hundreds or thousands of individual connections. Because deep neural networks can be trained to perform a wide range of tasks with a high degree of accuracy, deep neural networks are becoming widely adopted in the field of artificial intelligence. However, various problems can arise when designing and deploying deep neural networks.

First, due to the inherent complexity of deep neural networks, designers cannot directly observe or understand how a deep neural network operates. As a result, a typical designer usually cannot determine which components of the deep neural network are involved with producing specific behaviors or outcomes. Thus, even when a given deep neural network appears to operate with high accuracy relative to validation data, the designer usually cannot explain why the deep neural network operates with such high accuracy or why the deep neural network should continue to operate with high accuracy in a real-world implementation. Because the underlying mechanisms of deep neural networks cannot be understood or explained, deep neural networks oftentimes cannot be deployed in systems, such as autonomous vehicles or robotic surgical systems, where inaccurate operation can have grave consequences.

Second, because designers cannot directly observe or understand how a deep neural network operates, designers usually cannot identify which components of a given deep neural network should be modified if that deep neural network produces inaccurate results. Consequently, a deep neural network that produces inaccurate results usually has to be retrained using different training data and/or different initial conditions. However, even when a deep neural network is retrained and subsequently operates with high accuracy, for the reasons discussed above, the designer typically cannot understand or explain why retraining the deep neural network improved the overall operation of the network.

As the foregoing illustrates, what is needed in the art are more effective techniques for analyzing the operation of deep neural networks.

SUMMARY

Various embodiments include a computer-implemented method for analyzing characteristics of neural networks, including causing a first neural network to perform a first operation based on a first input, and causing a second neural network to generate a natural language expression based on the first operation, wherein the natural language expression indicates to a user one or more characteristics of the first neural network when performing the first operation.

At least one technical advantage of the disclosed techniques relative to the prior art is that the disclosed AI model automatically generates natural language descriptions characterizing how a given underlying system, such as a neural network, operates and functions. These descriptions enable the designer of the underlying system to articulate and explain the functional characteristics of the system, thereby helping the designer and others understand suitable applications for the system.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, due to the inherent complexity of deep neural networks, designers cannot directly observe or understand how a deep neural network operates and therefore usually cannot determine which components of the deep neural network are involved with producing specific behaviors or outcomes. Consequently, even when a given deep neural network appears to operate with high accuracy, the designer usually cannot explain why the deep neural network operates with high accuracy or provide any logical support for why the deep neural network should continue to operate with high accuracy in a real-world scenario. Because designers cannot directly observe or understand how a deep neural network operates, designers usually cannot identify which components of the deep neural network should be modified if the deep neural network produces inaccurate results. Deep neural networks that produce inaccurate results oftentimes have to be retrained with different training data and/or retrained starting with different initial conditions. However, if a given deep neural network is retrained in this manner and subsequently operates with high accuracy, designers still cannot understand or explain why the deep neural network operates with high accuracy for the reasons discussed above.

To address these issues, various embodiments include a computer system that includes one or more feature models coupled to one or more observer models in a hierarchical fashion. The feature models are configured to process an input to detect different features within that input. The observer models are configured to analyze the operation of the feature models during processing of the input to generate various types of observations. One type of observation includes a natural language expression that conveys how various architectural and/or functional characteristics of a given feature model influence the processing of the input to detect features, thereby exposing the underlying mechanisms via which the given feature model operates.

At least one technical advantage of the disclosed techniques relative to the prior art is that the disclosed techniques automatically generates natural language descriptions characterizing how a computer system, such as a neural network, operates and functions. These descriptions enable the designer to articulate and explain the functional characteristics of the computer system, thereby helping the designer and others understand suitable applications for the computer system. In addition, the natural language descriptions can provide designers with insight regarding how to improve and/or repair the computer system that otherwise cannot be understood using conventional techniques. These technical advantages represent one or more technological advancements over prior art approaches.

System Overview

Figure 1:
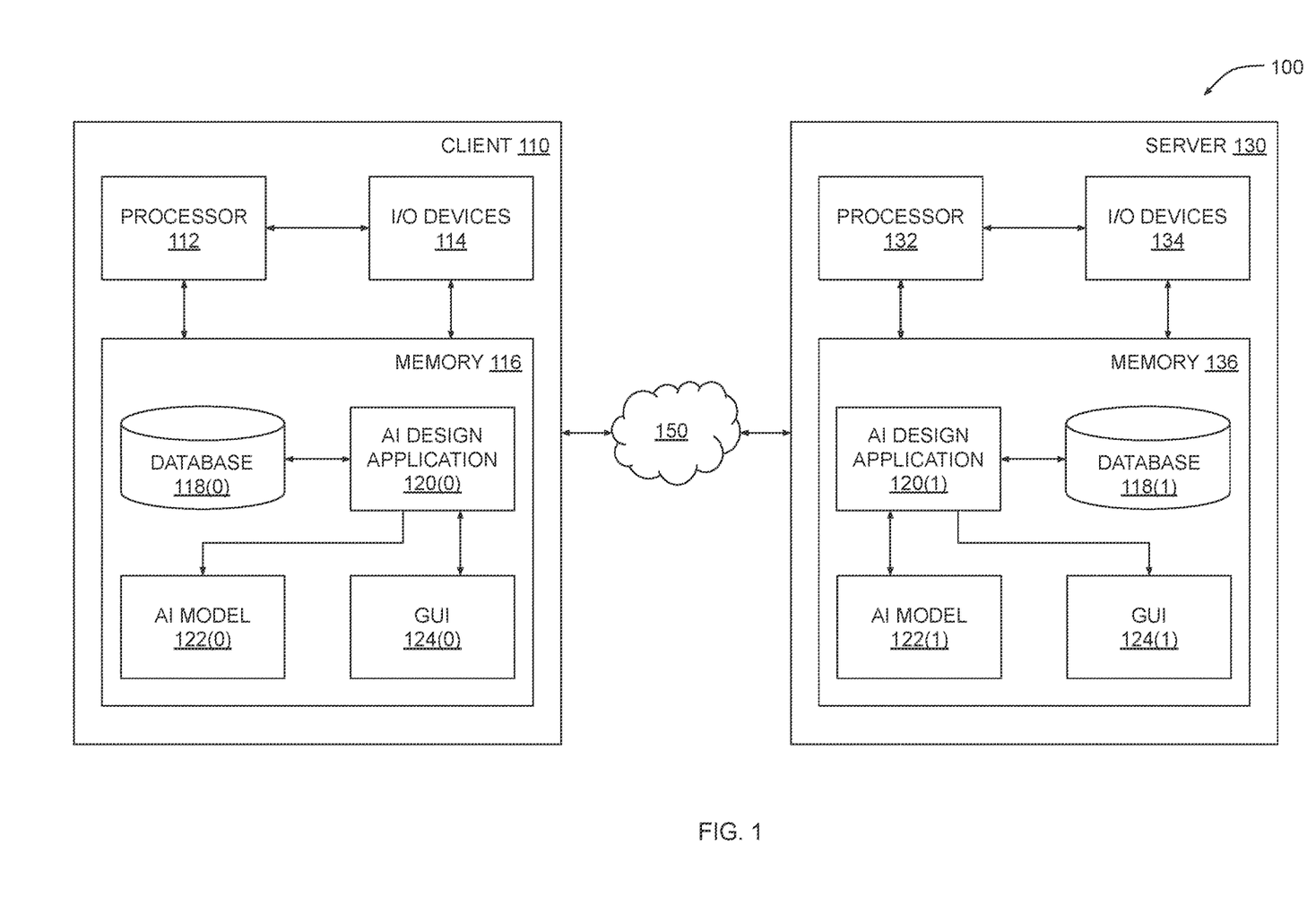
FIG. 1 illustrates a system configured to implement one or more aspects of the various embodiments.

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others. Client 110 and server 130 are configured to communicate via network 150.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs), one or more graphics processing units (GPUs), and/or one or more parallel processing units (PPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118(0), an artificial intelligence (AI) design application 120(0), an AI model 122(0), and a graphical user interface (GUI) 124(0). Database 118(0) is a file system and/or data storage application that stores various types of data. AI design application 120(0) is a software application that, when executed by processor 112, interoperates with a corresponding software application executing on server 130 to generate, analyze, evaluate, and describe one or more AI models. AI model 122(0) includes one or more artificial neural networks configured to perform general-purpose or specialized artificial intelligence-oriented operations. GUI 124(0) allows a user to interact with AI design application 120(0).

Server 130 includes a processor 132, I/O devices 134, and a memory 136, coupled together. Processor 132 includes any technically feasible set of hardware units configured to process data and execute software applications, such as one or more CPUs, one or more GPUs, and/or one or more PPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes a database 118(1), an AI design application 120(1), an AI model 122(1), and a GUI 124(1). Database 118(1) is a file system and/or data storage application that stores various types of data, similar to database 118(0). AI design application 120(1) is a software application that, when executed by processor 132, interoperates with AI design application 120(0) to generate, analyze, evaluate, and describe one or more AI models. AI model 122(1) includes one or more artificial neural networks configured to perform general-purpose or specialized artificial intelligence-oriented operations. GUI 124(1) allows a user to interface with AI design application 120(1).

As a general matter, databases 118(0) and 118(1) represent separate portions of a distributed storage entity. Thus, for simplicity, databases 118(0) and 118(1) are collectively referred to herein as database 118. Similarly, AI design applications 120(0) and 120(1) represent separate portions of a distributed software entity that is configured to perform any and all of the inventive operations described herein. As such, AI design applications 120(0) and 120(1) are collectively referred to hereinafter as AI design application 120. AI models 122(0) and 122(1) likewise represent a distributed AI model that includes one or more neural networks. Accordingly, AI models 122(0) and 122(1) are collectively referred to hereinafter as AI model 122. GUIs 124(0) and 124(1) similarly represent distributed portions of one or more GUIs. GUIs 124(0) and 124(1) are collectively referred to herein as GUI 124.

In operation, AI design application 120 generates AI model 122 based on user input that is received via GUI 124. GUI 124 exposes design and analysis tools that allow the user to create and edit AI model 122, explore the functionality of AI model 122, evaluate AI model 122 relative to training data, and generate various data describing and/or constraining the performance and/or operation of AI model 122, among other operations. AI model 122 is described in greater detail below in conjunction with FIG. 2. An example screenshot of GUI 124 is described in greater detail below in conjunction with FIG. 3.

Software Overview

Figure 2:
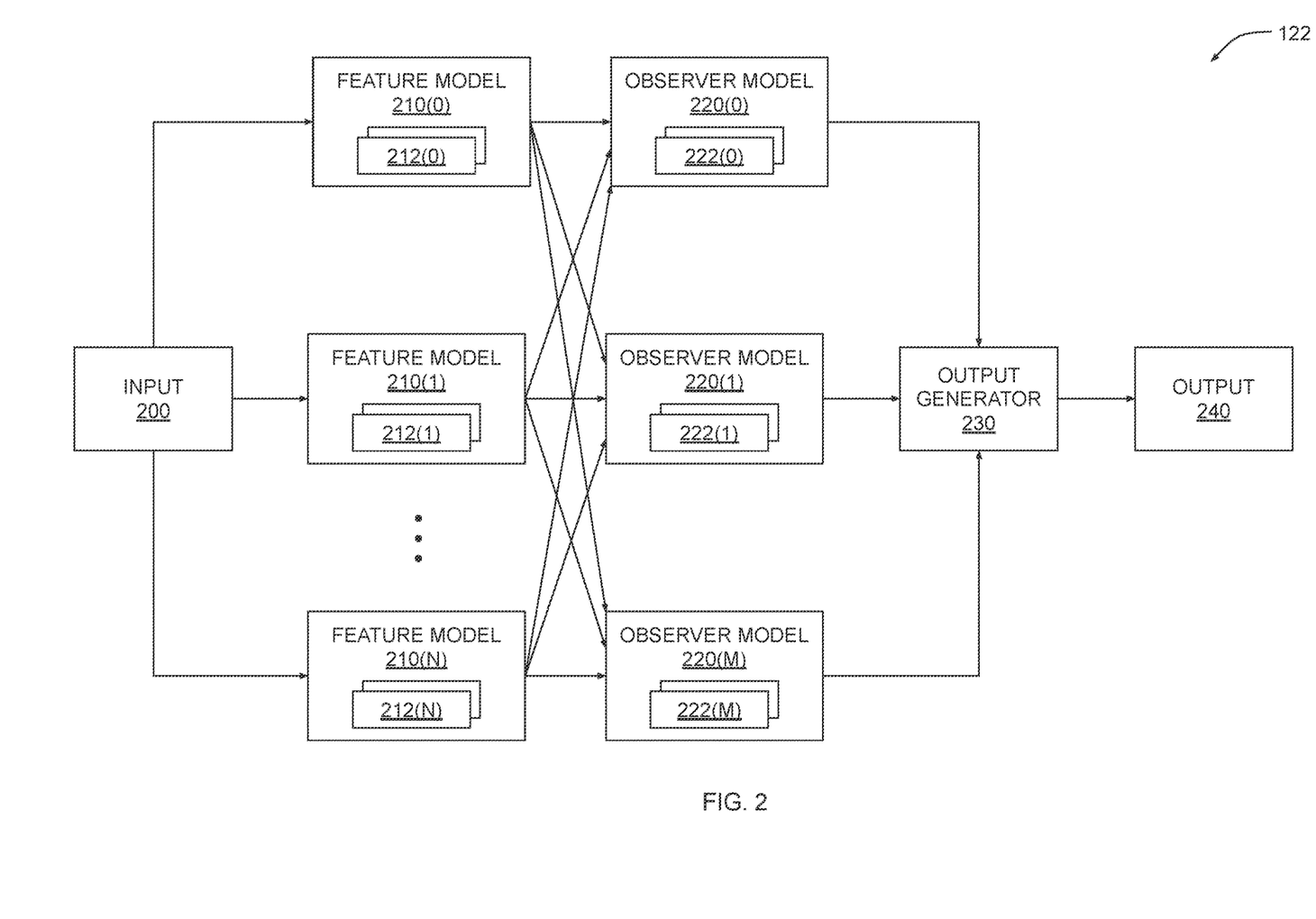
FIG. 2 is a more detailed illustration of the artificial intelligence (AI) model of FIG. 1, according to various embodiments.

FIG. 2 is a more detailed illustration of the artificial intelligence (AI) model of FIG. 1, according to various embodiments. As shown, AI model 122 is a hierarchical system of interconnected modules that are configured to interoperate with one another to process input 200 and generate output 240. Input 200 generally includes any technically feasible type of data, including audio data, video data, image data, text data, raw and/or processed sensor data, any combination of such data, and so forth. Output 240 generally includes at least one of a classification associated with input 200 or a set of natural language expressions that describes the operation of AI model 122 when processing input 200.

AI model 122 includes feature models 210(O) through 210(N), observer models 220(O) through 220(M), and output generator 230, where N and M are integer values. Feature models 210(O) through 210(N) are coupled to observer models 220(O) through 220(M). Observer models 220(O) through 220(M) are coupled to output generator 230. Feature models 210(O) through 210(N) are configured to process input 200 to generate feature data 212(O) through 212(N), respectively. Observer models 220(O) through 220(M) are configured to process feature data 212(O) through 212(N), in addition to other data associated with feature models 210, to generate observation data 222(O) through 222(M), respectively. Output generator 230 is configured to combine observation data 222(O) through 222(M) to generate output 240.

A given feature model 210 is generally any computer model or algorithm that processes input data to generate a set of output data. In various embodiments, a given feature model 210 is a neural network that implements one or more feature detection algorithms to quantify the presence of one or more features within input 200 and to generate feature data 212 to represent the detected features. A given feature model 210 may be configured to identify low-level features, such as basic geometric shapes, short sequences of audio samples, simple data patterns, and other features associated with various data types. Alternatively, a given feature model 210 may be configured to identify high level features, such as real-world objects, spoken words, complex patterns of data, and other features associated with various data types. In various embodiments, a given feature model 210 may be a binary convolutional neural network (CNN), a feature map, a classifier, or any other technically feasible type of AI algorithm or neural network algorithm capable of detecting features.

A given observer model 220 may implement one or more classification algorithms based on some or all of the output data generated by the feature models 210 in order to generate observation data 222. Observation data 222 may reflect one or more classifications assigned to that feature data 212. A given observer model 220 may be configured to map various sets of feature data 212 to a specific classification using any technically feasible approach. For example, a given observer model 220 could determine that the presence of a specific set of geometric shapes identified via feature models 210 indicates that those geometric shapes should be classified as belonging to a human face. Persons skilled in the art will understand how any technically feasible classification technique can be implemented, based on one or more features set forth in feature data 212, to generate observation data 222 that includes one or more classifications.

A given observer model 220 may also implement one or more natural language processing algorithms based on a given set of feature data 212 in order to generate observation data 222 that describes the operation of the corresponding feature model 210 when generating that feature data 212. In so doing, a given observation model 220 may be configured to analyze feature data 212, along with architectural data and/or functional data associated with the feature model 210, to generate the natural language expression(s) included in observation data 222. In various embodiments, a given observer model 220 may be a decision tree, a rules engine, a neural network, or any other technically feasible type of algorithm capable of processing feature data 212 to generate observations.

Output generator 230 generally implements one or more data aggregation algorithms in order to combine observation data 222 received from some or all observer models 220 to generate output 240. Output generator 230 can combine classifications set forth in observation data 222 and/or natural language expressions set forth in observation data 222 to generate output 240. For example, output generator 230 could receive M classifications associated with observation data 222(0) through 222(M) and then rank those classifications based on the number of times each classification appears in that observation data. Output generator 230 could then select the highest-ranked classification and include that classification within output 240. In another example, output generator 230 could receive, within first observation data 222, a first natural language expression that articulates the operation of a first neural network layer within a given feature model 210. Output generator 230 could also receive, within second observation data 222, a second natural language expression that articulates the operation of a second neural network layer within the given feature model 210. Output generator 230 could then combine the first natural language expression and the second natural language expression to compose a narrative that describes the overarching operation of that feature model 210.

In some instances, output generator 230 can compose narratives that describe the real-time functionality of a given feature model 210 based on a set of natural language expressions received from one or more observer models 220. For example, output generator 230 could receive, within first observation data 222, a first natural language expression that articulates the operation of a first neural network layer within a given feature model 210 during a first interval of time. Output generator 230 could also receive, within second observation data 222, a second natural language expression that articulates the operation of the first neural network layer during a second interval of time. Output generator 230 could then combine the first natural language expression and the second natural language expression to compose a narrative that describes the time-varying operation of that feature model 210.

In one embodiment, output generator 230 may receive one or more sets of observation data 222 that expresses, via natural language, different classifications that one or more corresponding observer models 220 generate based on one or more sets of feature data 212. Output generator 230 may then extract these classifications and combine those classifications to generate output 240.

As a general matter, observer models 220 can generate observation data 222 that reflects any technically feasible description of any aspect of feature models 210, including any outputs produced by those feature models 210, any architectural characteristics of those feature models 210, and/or any functional characteristics of those feature models 210. Further, output generator 230 can combine any and/or all observation data 222 in order to generate output 240.

Person skilled in the art will appreciate that, in various embodiments, an observer system similar to the systems described herein can be designed and implemented for any underlying system in order to evaluate and report the operations of that underlying system. In that regard, in various embodiments, observer models 220 can operate on output data generated by any type of computer system to generate observation data 222. For example and without limitation, observer models 220 can operate on output data generated by a recommendation system, a database system, an identity management system, or a social networking system to generate observation data 222. The observation data 222 are descriptions or explanations of the functional characteristics of the underlying computer system and enable a deeper understanding of the operation of the computer system.

As mentioned above, AI design application 120 generates AI model 122 based on user interactions with GUI 124. An exemplary screenshot depicting various elements of GUI 124 is described in greater detail below in conjunction with FIG. 3.

Figure 3:
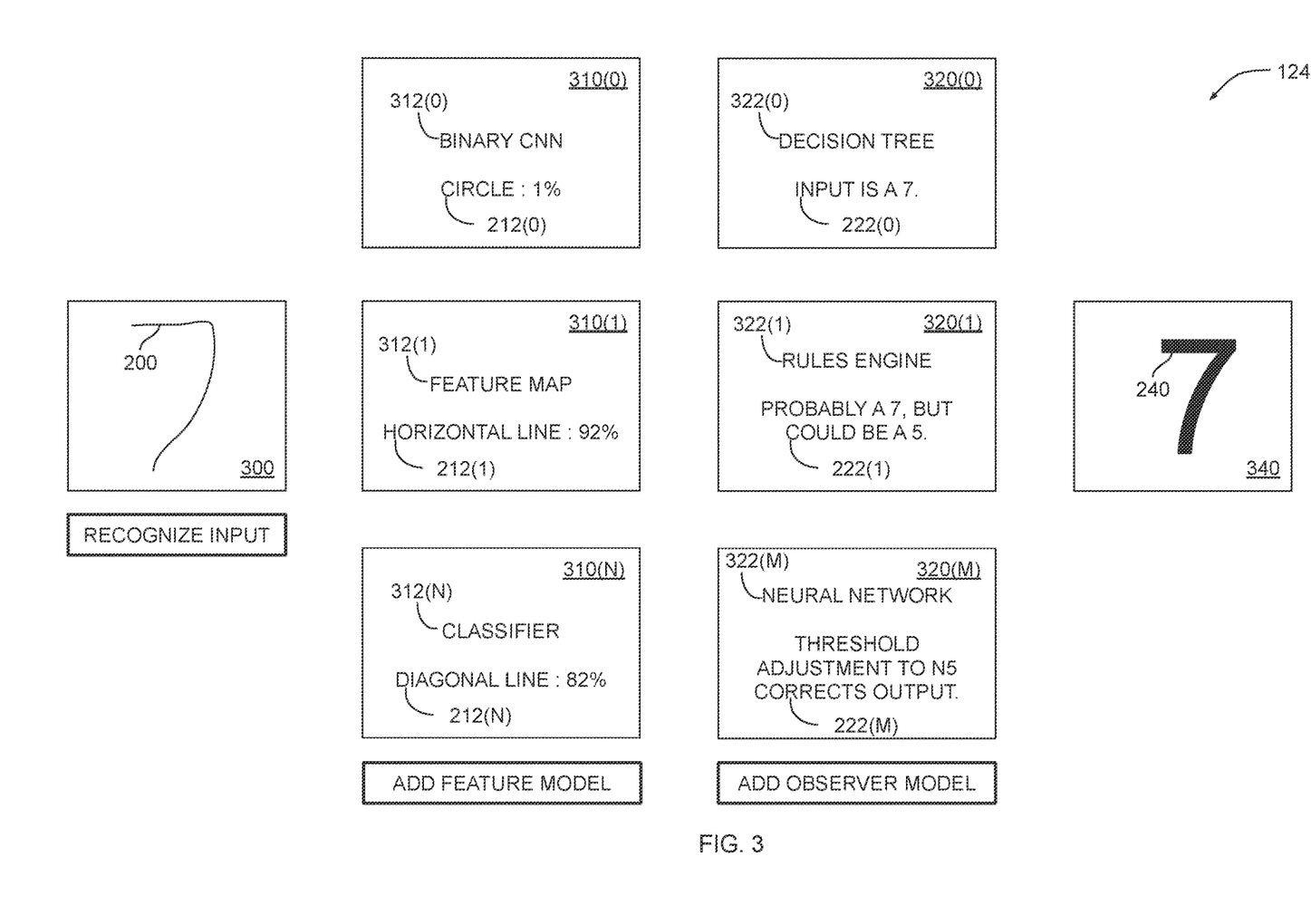
FIG. 3 is an example depiction of the graphical user interface (GUI) of FIG. 1, according to various embodiments.

FIG. 3 is an example screenshot of the graphical user interface (GUI) of FIG. 1, according to various embodiments. As shown, GUI 124 includes a number of user interface (UI) elements with which a user can interact in order to configure AI model 122. In particular, GUI 124 includes UI elements 300, 310(0) through 310(N), 320(0) through 320(M), and 340.

UI element 300 is an input element via which the user can enter input 200. In the example shown, input 200 is a handwritten "7." UI element 300 may be configured to receive any technically feasible type of input, including audio data, video data, image data, and the other types of data discussed above in conjunction with FIG. 2.

UI elements 310 are input and output elements via which the user can select different types of feature models 210 and then receive different feature data 212. In the example shown, UI element 310(0) indicates that a selection 312(0) of a "binary CNN" type feature model results in feature data 212(0) indicating a degree to which a circle is present in input 200. UI element 310(1) indicates that a selection 312(1) of a "feature map" type feature model results in feature data 212(1) indicating a degree to which a horizontal line is present in input 200. UI element 310(N) indicates that a selection 312(N) of a "classifier" type feature model results in feature data 212(N) indicating a degree to which a diagonal line is present in input 200. In various embodiments, UI elements 310 may be used to configure some or all feature models 210 to be of the same type or of different types and/or to detect the same type of feature or different types of features. For example, UI elements 310 could be used to configure a set of N binary CNNs that detect different geometrical features within input 200.

UI elements 320 are input and output elements via which the user can select different types of observer models 220 and then receive different observation data 222. In the example shown, UI element 320(0) indicates that a selection 322(0) of a "decision tree" type observer model results in observation data 222(0) expressing, via natural language, that input 200 is a "7." UI element 320(1) indicates that a selection 322(1) of a "rules engine" type observer model results in observation data 222(1) expressing, via natural language, that input 200 probably is a "7" but could also be a "5." UI element 320(M) indicates that a selection 322(M) of a "neural network" type observer model results in observation data 222(M) expressing, via natural language, that an adjustment to the threshold of a particular neuron would correct an erroneous output. In various embodiments, UI elements 320 may also be used to select how feature models 210 are coupled to observer models 220 and/or what data derived from feature models 210 is processed by observer models 220 coupled thereto.

UI element 340 is an output element via which output 240 is provided to the user. In the example shown, output 240 is a "7" indicating that AI model 122 has classified input 200 as being a "7." UI element 340 may be configured to output any technically feasible type of input, including audio data, video data, image data, and the other types of data discussed above in conjunction with FIG. 2.

Figure 4:
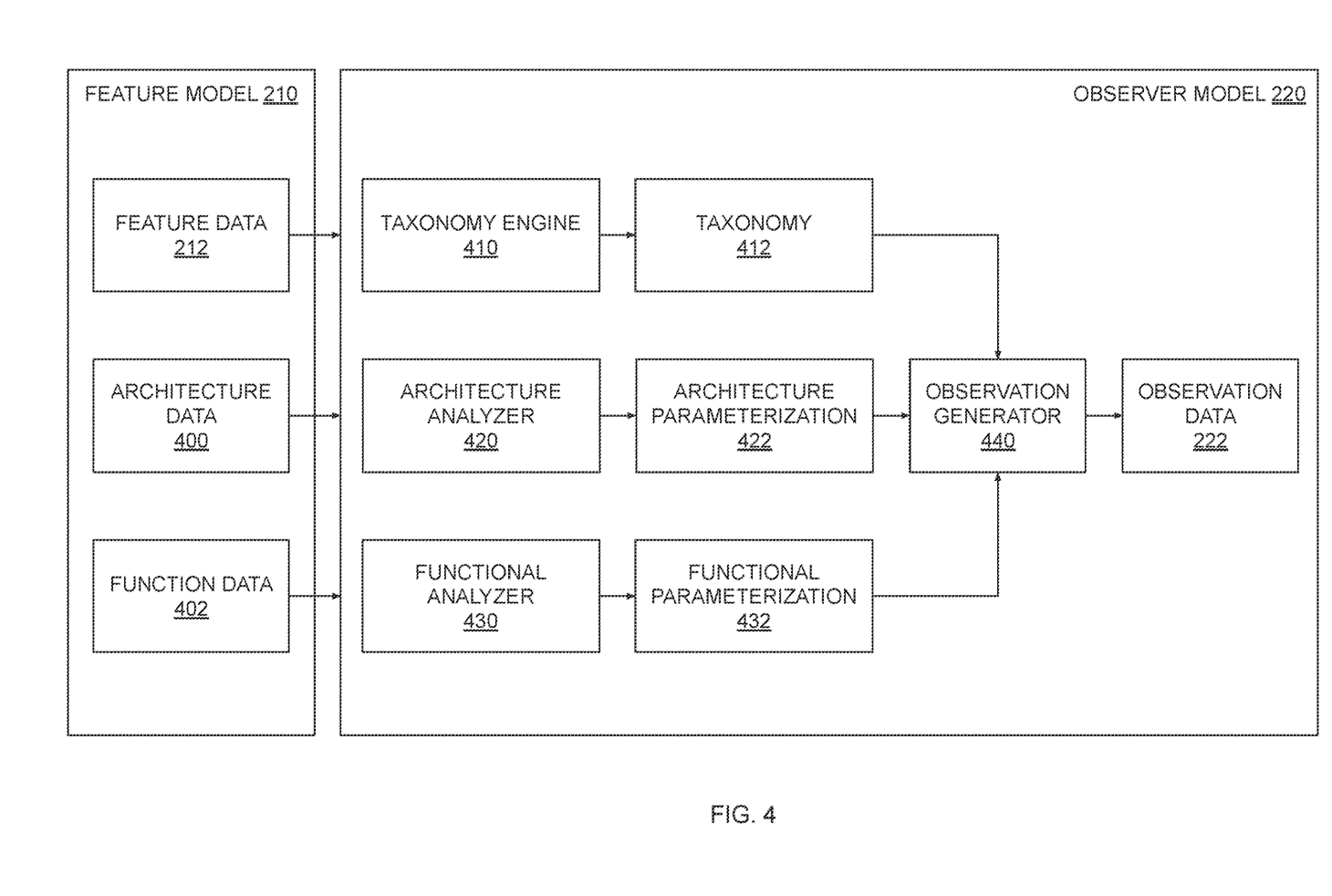
FIG. 4 is a more detailed illustration of one of the observer models and one of the feature models of FIG. 2, according to various embodiments.
Figure 5:
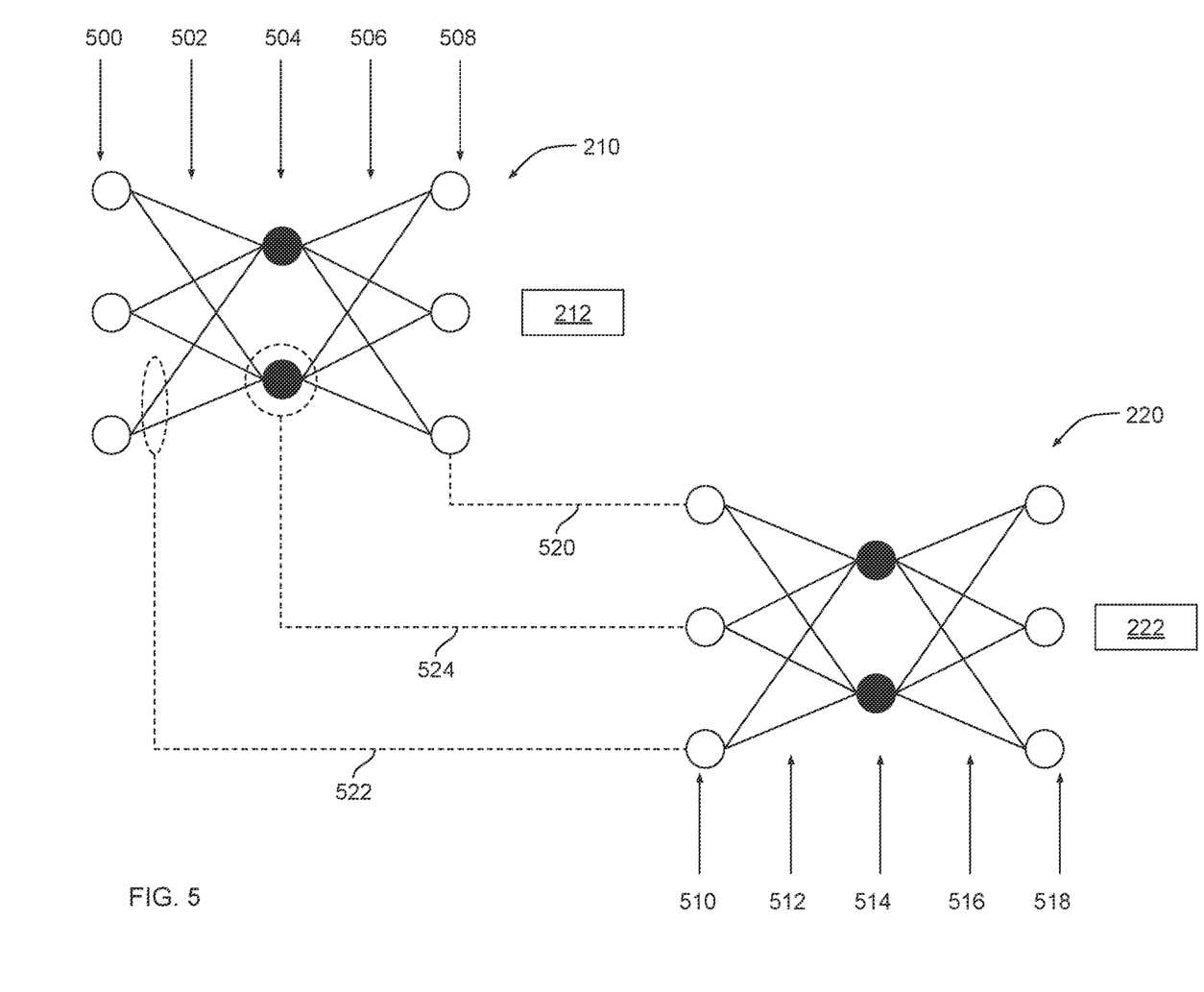
FIG. 5 is an example coupling between one of the observer models and one of the feature models of FIG. 2, according to various embodiments.
Figure 6:
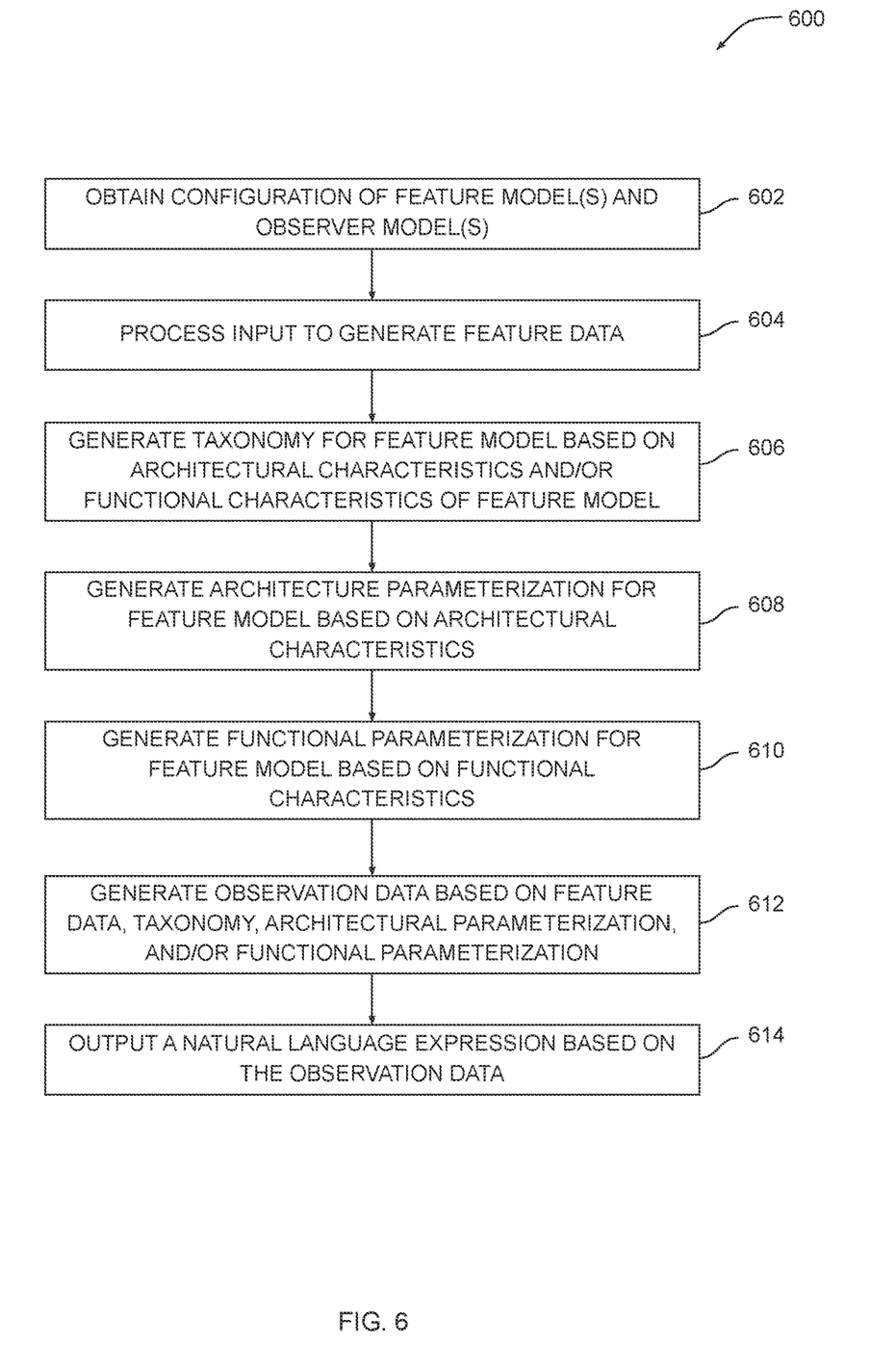
FIG. 6 is a flow diagram of method steps for generating natural language expressions that describe the operation of a neural network, according to various embodiments.

Referring generally to FIGS. 1-3, the disclosed techniques can be applied to generate AI models 122 having a wide variety of different configurations of feature models 210 and observer models 220. Further, the disclosed techniques can be implemented to configure any given observer model 220 to generate observation data 222 that describes, using natural language, any technically feasible aspect of any given feature model 210. FIGS. 4-6 set forth various techniques that can be implemented by observer models 220 in order to generate natural language expressions based on one or more feature models 210.

Generating Natural Language Descriptions of Feature Models

FIG. 4 is a more detailed illustration of one of the observer models and one of the feature models of FIG. 2, according to various embodiments. As shown, feature model 210 includes feature data 212, architecture data 400, and function data 402. Architecture data 400 and function data 402 generally define a neural network that performs the various operations of feature model 210. As also shown, observer model 220 includes taxonomy generator 410, architecture analyzer 420, function analyzer 430, and observation generator 440.

Feature data 212 includes, as described above in conjunction with FIG. 2, data related to one or more features detected within input 200, and/or the degree to which those features are detected in that input. In various embodiments, feature data 212 indicates one type of feature that feature model 210 is configured to detect, along with a metric value indicating the degree to which that one type of feature is detected within input 200.

Architecture data 400 includes data that defines the organization and/or interconnections between each internal element of the neural network defined by feature model 210. For example, architecture data 400 could define one or more layers of a neural network, one or more functions implemented within any of those layers, various sets of neurons included in any of those layers, any interconnections between neurons and/or layers, any weight values associated with those interconnections, and so forth. Persons skilled in the art will understand that numerous approaches for defining the architecture of a neural network exist in the art, and that any such approach can be implemented to generate architecture data 400.

Function data 402 includes data that defines specific mathematical functions implemented by one or more elements of the neural network defined by feature model 210. For example, function data 402 could indicate that a particular node within feature model 210 implements a summation function, a threshold comparison, a softmax function, a rectified linear unit (ReLU), and so forth. Persons skilled in the art will understand that numerous approaches for defining functions executed by a neural network exist in the art, and that any such approach can be implemented to provide function data 402.

In one embodiment, architecture data 400 and function data 402 may be collectively represented by a set of mathematical expressions that define both the structure of the neural network and the operations performed by that neural network. In this embodiment, the collective representation of architecture data 400 and function data 402 may be expressed using a natural language associated with the field of mathematics.

In operation, the various modules included in observer model 220 process feature data 212, architecture data 400, and function data 402 in order to generate observation data 222 discussed above in conjunction with FIG. 2.

In particular, taxonomy engine 410 processes feature data 212, architecture data 400, and function data 402 in order to generate taxonomy 412. Taxonomy 412 includes a set of syntactic elements that describe all aspects of the aforesaid data. For example, taxonomy 412 could include a set of words used to describe a feature associated with feature data 212, a set of words used to describe various architectural characteristics set forth in architecture data 400, and/or a set of words used to describe various functions defined in function data 402. In addition, taxonomy may further include any additional syntactic elements needed to compose grammatical natural language expressions.

Architecture analyzer 420 analyzes architecture data 400 to generate architecture parameterization 422. Architecture parameterization 422 includes a set of parametric values that represent the architecture of the neural network defined by feature model 210. For example, architecture parameterization 422 could indicate the number of layers included in the neural network, the number of neurons included in each layer, and so forth. Architecture analyzer 420 may implement any technically feasible parameterization technique to generate architecture parameterization 422.

Function analyzer 430 analyzes function data 430 to generate function parameterization 432. Function parameterization 432 includes a set of parametric values that define one or more functions implemented within the neural network defined by feature model 210. For example, function parameterization 432 could include a set of threshold values associated with a given layer of the neural network. Function analyzer 430 may implement any technically feasible parameterization technique to generate function parameterization 432.

Observation generator 440 is configured to process taxonomy 412, architecture parameterization 422, and function parameterization 432 in order to generate one or more natural language expressions set forth in observation data 222. In so doing, observation generator 440 assembles one or more syntactic elements included in taxonomy 412, based on architecture parameterization 422 and/or function parameterization 432, to describe the operation of feature model 210 when generating feature data 212. In one embodiment, observation generator 440 includes a neural network that is trained based on various architecture parameterizations and function parameterizations to select syntactic elements within taxonomies associated with one or more underlying neural networks. Persons skilled in the art will understand that observation generator 440 may implement any technically feasible approach to generating natural language expressions when generating observation data 222.

In one embodiment, both feature model 210 and observer model 220 may be implemented by neural networks that are interconnected with one another in a manner that facilitates the generation of observation data 222. FIG. 5 sets forth an example of how two such neural networks can be configured.

FIG. 5 is an example coupling between one of the observer models and one of the feature models of FIG. 2, according to various embodiments. As shown, feature model 210 is coupled to observer model 220. As also shown, feature model 210 and observer model 220 are implemented by neural networks.

In particular, feature model 210 is a neural network that includes an input layer 500, a first set of interconnections 502, one or more intermediate layers 504, a second set of interconnections 506, and an output layer 508. Output layer 508 outputs feature data 212. Observer model 220 is a neural network that includes an input layer 510, a first set of interconnections 512, one or more intermediate layers 514, a second set of interconnections 516, and an output layer 518. Output layer 518 outputs observation data 222. The various input layers, intermediate layers, and output layers shown here can include any technically feasible type of neural network layer. The various interconnections shown here can include any technically feasible type of neural network connection configured to implement any technically feasible neural network architecture. Further, any given interconnection can be associated with one or more weight values.

Observer model 220 is coupled to various portions of feature model 210 via input connections 520, 522, and 524. Specifically, observer model 220 is coupled to output layer 508 of feature model 210 via input connections 520, coupled to interconnections 502 of feature model 210 via input connections 522, and coupled to intermediate layer(s) 504 of feature model 210 via input connections 524. Observer model 220 is configured to generate observation data 222 based on data that is captured, via input connections 520, 522, and 524, from the various portions of feature model 210 shown.

In particular, observer model 220 may generate observation data 222 based on feature data 212 captured from output layer 508 via input connection 520. Observer model 220 may also generate observation data 222 based on one or more values captured from interconnections 502 via input connection 522. Observer model 220 may also generate observation data 222 based on one or more values captured from intermediate layer(s) 504 via input connection 524. Any given value captured from any internal portion of feature model 210, such as those captured via input connections 522 and/or 524, may correspond to an intermediate value generated within feature model 210 during processing of input 200, an architectural characteristic (or parameterization thereof) of feature model 210, and/or a functional characteristic (or parameterization thereof) of feature model 210. For example, a given value captured via input connections 522 and/or 524 could be a set of activation levels, a set of bias values, a set of threshold values, and so forth.

Via the above types of inputs, and based on the above data associated with feature model 210, observer model 220 generates observation data 222 to include one or more natural language expressions that describe the operation of feature model 210. As described above in conjunction with FIG. 4, those natural language expressions can be generated based on a taxonomy of syntactic elements that reflect various architectural and/or functional characteristics of feature model 210. Via these techniques, observer model 220 can expose the underlying functionality of feature model 210 and produce explanations that describe how feature model 210 operates and/or ways that feature model 210 can be modified to improve performance. These techniques are described in greater detail below in conjunction with FIG. 6.

FIG. 6 is a flow diagram of method steps for generating natural language expressions that describe the operation of a neural network, according to various embodiments. Although the method steps are described in conjunction with the systems of FIGS. 1-5, persons skilled in the art will understand that any system configured to perform the method steps in any order falls within the scope of the present embodiments.

As shown, a method 600 begins at step 602, where GUI 124 of FIG. 1 obtains a configuration of feature model(s) 210 and observer model(s) 220 via interactions with the user. GUI 124 allows the user to select different types of feature models 210 and different types of observer models 220 and indicate how those models should be coupled together. FIG. 3 sets forth an example screenshot of GUI 124. Based on the configuration of feature models 210 and observer models 220, AI design application 120 of FIG. 1 generates AI model 122, as described above in conjunction with FIG. 2.

At step 604, AI model 122 causes a feature model 210 to process input to generate feature data 212. A given feature model 210 generally is a neural network that implements one or more feature detection algorithms to quantify the presence of one or more features within the input and to represent the detected features via feature data 212. A given feature model 210 may be configured to identify low-level features, such as basic geometric shapes, short sequences of audio samples, simple data patterns, and other features associated with various data types. Alternatively, a given feature model 210 may be configured to identify high level features, such as real-world objects, spoken words, complex patterns of data, and other features associated with various data types. Feature models 210 may perform convolution operations, aggregation operations, threshold comparison operations, and other types of operations commonly associated with neural networks and/or deep neural networks.

At step 606, taxonomy generator 410 within observer model 220 generates taxonomy 412 for the feature model 220 based on architectural characteristics and/or functional characteristics of the feature model 210. The architectural characteristics can be defined via architecture data 400 of FIG. 4. The functional characteristics can be defined via function data 402 of FIG. 4. Taxonomy 412 includes a set of syntactic elements that describe the architectural characteristics and functional characteristics of feature model 210. For example, taxonomy 412 could include a set of words used to describe a feature associated with feature data 212, a set of words used to describe various architectural characteristics set forth in architecture data 400, and/or a set of words used to describe various functions defined in function data 402. In addition, taxonomy may further include any additional syntactic elements needed to compose grammatically correct natural language expressions.

At step 608, architecture analyzer 420 within observer model 220 generates architecture parameterization 422 for feature model 210 based on the architectural characteristics set forth in architecture data 400 and discussed above in conjunction with step 606. Architecture parameterization 422 includes a set of parametric values that represent the architecture of the neural network defined by feature model 210. For example, architecture parameterization 422 could indicate the number of layers included in the neural network, the number of neurons included in each layer, and so forth. Architecture analyzer 420 may implement any technically feasible parameterization technique to generate architecture parameterization 422.

At step 610, function analyzer 430 generates functional parameterization 432 for feature model 210 based on functional characteristics set forth in function data 402 and discussed above in conjunction with step 606. Function parameterization 432 includes a set of parametric values that define one or more functions implemented within the neural network defined by feature model 210. For example, function parameterization 432 could include a set of threshold values associated with a given layer of the neural network. Function analyzer 430 may implement any technically feasible parameterization technique to generate function parameterization 432.

At step 612, observation generator 440 within observer model 220 generates observation data 222 based on feature data 212, taxonomy 412, architectural parameterization 422, and/or functional parameterization 432 generated at steps 604, 606, 608, and 610, respectively. Observation data 220 includes one or more natural language expressions that describe various aspects of feature model 210. Observation generator 440 assembles one or more syntactic elements included in taxonomy 412, based on architecture parameterization 422 and/or function parameterization 432, to describe the operation of feature model 210 when generating feature data 212. In one embodiment, observation generator 440 includes a neural network that is trained based on various architecture parameterizations and function parameterizations to select and/or assemble syntactic elements within taxonomies associated with one or more underlying neural networks.

At step 614, output generator 330 within AI model 122 outputs one or more natural language expressions based on the observation data. The one or more natural language expressions can be output via GUI 124, as shown in FIG. 3, or stored in memory for subsequent use. Importantly, the natural language expressions generated and output according to the disclosed techniques articulate the underlying mechanisms through which feature model 210 is capable of performing various operations.

In sum, an artificial intelligence (AI) model includes one or more feature models coupled to one or more observer models in a hierarchical fashion. The feature models are configured to process an input to detect different features within that input. The observer models are configured to analyze the operation of the feature models during processing of the input to generate various types of observations. One type of observation includes a natural language expression that conveys how various architectural and/or functional characteristics of a given feature model influence the processing of the input to detect features, thereby exposing the underlying mechanisms via which the given feature model operates.

At least one technological advantage of the disclosed techniques relative to the prior art is that the disclosed AI model automatically generates natural language descriptions characterizing how a given neural network operates and functions. These descriptions enable the designer to articulate and explain the functional characteristics of the neural network to others, thereby helping others to understand suitable applications for the AI model. In addition, these descriptions can provide designers with insight regarding how to improve and/or repair neural networks that otherwise cannot be understood. These technological advantages represent one or more technological advancements over prior art approaches.

1. In various embodiments, a computer-implemented method for analyzing characteristics of neural networks comprises causing a first neural network to perform a first operation based on a first input, and causing a second neural network to generate a natural language expression based on the first operation, where the natural language expression indicates to a user one or more characteristics of the first neural network when performing the first operation.

2. The computer-implemented method of clause 1, further comprising causing the second neural network to generate a taxonomy of syntactic elements based on at least one of an architectural characteristic or a functional characteristic of the first neural network and to generate the natural language expression using the taxonomy of syntactic elements.

3. The computer-implemented method of clause 1 or 2, further comprising causing the second neural network to perform a parameterization operation with the first neural network to generate an architecture parameterization that quantifies at least one architectural characteristic of the first neural network and to generate the natural language expression using the architecture parameterization.

4. The computer-implemented method of any of clauses 1-3, further comprising causing the second neural network to perform a parameterization operation with the first neural network to generate a function parameterization that quantifies at least one functional characteristic of the first neural network and to generate the natural language expression using the function parameterization.

5. The computer-implemented method of any of clauses 1-4, where the first operation comprises a convolution operation, an aggregation operation, or a threshold comparison operation.

6. The computer-implemented method of any of clauses 1-5, where the one or more characteristics include at least one of an architectural characteristic or a functional characteristic of the first neural network.

7. The computer-implemented method of any of clauses 1-6, where the first operation comprises a feature detection operation that quantifies a degree to which the first input includes a first type of feature.

8. The computer-implemented method of any of clauses 1-8, where the second neural network comprises a deep neural network that is trained to generate natural language expressions based on at least one of one or more architectural characteristics of the first neural network or one or more functional characteristics of the first neural network.

9. In various embodiments, a non-transitory computer-readable medium stores program instructions that, when executed by a processor, causes the processor to perform the steps of causing a first neural network to perform a first operation based on a first input, and causing a second neural network to generate a natural language expression based on the first operation, where the natural language expression indicates to a user one or more characteristics of the first neural network when performing the first operation.

10. The non-transitory computer-readable medium of clause 9, further comprising the step of causing the second neural network to generate a taxonomy of syntactic elements based on at least one of an architectural characteristic or a functional characteristic of the first neural network and to generate the natural language expression using the taxonomy of syntactic elements.

11. The non-transitory computer-readable medium of clause 9 or 10, further comprising the step of causing the second neural network to perform a parameterization operation with the first neural network to generate an architecture parameterization that quantifies at least one architectural characteristic of the first neural network and to generate the natural language expression using the architecture parameterization.

12. The non-transitory computer-readable medium of any of clauses 9-11, further comprising the step of further comprising causing the second neural network to perform a parameterization operation with the first neural network to generate a function parameterization that quantifies at least one functional characteristic of the first neural network and to generate the natural language expression using the function parameterization.

13. The non-transitory computer-readable medium of any of clauses 9-12, where the one or more characteristics include at least one of an architectural characteristic or a functional characteristic of the first neural network.

14. The non-transitory computer-readable medium of any of clauses 9-13, where the second neural network is coupled to an internal portion of the first neural network that is configured to perform the first operation.

15. The non-transitory computer-readable medium of any of clause 9-14, where the first neural network generates one or more intermediate values when performing the first operation, and where the second neural network generates the natural language expression based on the one or more intermediate values.

16. In various embodiments, a computer-implemented method for analyzing characteristics of neural networks comprises causing a first neural network to generate a first output based on a first input, and causing a second neural network to generate a natural language expression that conveys to a user at least one of an architectural characteristic or a functional characteristic of the first neural network when generating the first output.

17. The computer-implemented method of clause 16, where the second neural network is coupled to an internal portion of the first neural network that performs a first operation to generate the first output, and where the natural language expression conveys to the user at least one characteristic of the first operation.

18. The computer-implemented method of clause 16 or 17, further comprising outputting the natural language expression to a user or storing the natural language expression in memory.

19. The computer-implemented method of any of clauses 16-18, further comprising receiving, via a graphical user interface, configuration data indicating one or more interconnections between the first neural network and the second neural network; and configuring both the first neural network and the second neural network based on the configuration data.

20. The computer-implemented method of any of clauses 16-19, where the configuration data further indicates a neural network type associated with the first neural network and a neural network type associated with the second neural network.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing characteristics of neural networks, the method comprising:
receiving, via a graphical user interface, a configuration specifying one or more interconnections between a first neural network and a second neural network;
causing the first neural network to perform a first operation based on a first input; and
causing the second neural network to generate a natural language expression based on the first operation and the one or more interconnections included in the configuration, wherein the natural language expression indicates to a user one or more characteristics of the first neural network when performing the first operation.

2. The computer-implemented method of claim 1, further comprising causing the second neural network to generate a taxonomy of syntactic elements based on at least one of an architectural characteristic or a functional characteristic of the first neural network and to generate the natural language expression using the taxonomy of syntactic elements.

3. The computer-implemented method of claim 1, further comprising causing the second neural network to perform a parameterization operation with the first neural network to generate an architecture parameterization that quantifies at least one architectural characteristic of the first neural network and to generate the natural language expression using the architecture parameterization.

4. The computer-implemented method of claim 1, further comprising causing the second neural network to perform a parameterization operation with the first neural network to generate a function parameterization that quantifies at least one functional characteristic of the first neural network and to generate the natural language expression using the function parameterization.

5. The computer-implemented method of claim 1, wherein the first operation comprises a convolution operation, an aggregation operation, or a threshold comparison operation.

6. The computer-implemented method of claim 1, wherein the one or more characteristics include at least one of an architectural characteristic or a functional characteristic of the first neural network.

7. The computer-implemented method of claim 1, wherein the first operation comprises a feature detection operation that quantifies a degree to which the first input includes a first type of feature.

8. The computer-implemented method of claim 1, wherein the second neural network comprises a deep neural network that is trained to generate natural language expressions based on at least one of one or more architectural characteristics of the first neural network or one or more functional characteristics of the first neural network.

9. A non-transitory computer-readable medium storing program instructions that, when executed by a processor, causes the processor to perform the steps of:
receiving, via a graphical user interface, a configuration specifying one or more interconnections between a first neural network and a second neural network;
causing the first neural network to perform a first operation based on a first input; and
causing the second neural network to generate a natural language expression based on the first operation and the one or more interconnections included in the configuration, wherein the natural language expression indicates to a user one or more characteristics of the first neural network when performing the first operation.

10. The non-transitory computer-readable medium of claim 9, further comprising the step of causing the second neural network to generate a taxonomy of syntactic elements based on at least one of an architectural characteristic or a functional characteristic of the first neural network and to generate the natural language expression using the taxonomy of syntactic elements.

11. The non-transitory computer-readable medium of claim 9, further comprising the step of causing the second neural network to perform a parameterization operation with the first neural network to generate an architecture parameterization that quantifies at least one architectural characteristic of the first neural network and to generate the natural language expression using the architecture parameterization.

12. The non-transitory computer-readable medium of claim 9, further comprising the step of further comprising causing the second neural network to perform a parameterization operation with the first neural network to generate a function parameterization that quantifies at least one functional characteristic of the first neural network and to generate the natural language expression using the function parameterization.

13. The non-transitory computer-readable medium of claim 9, wherein the one or more characteristics include at least one of an architectural characteristic or a functional characteristic of the first neural network.

14. The non-transitory computer-readable medium of claim 9, wherein the second neural network is coupled to an internal portion of the first neural network that is configured to perform the first operation.

15. The non-transitory computer-readable medium of claim 9, wherein the first neural network generates one or more intermediate values when performing the first operation, and wherein the second neural network generates the natural language expression based on the one or more intermediate values.

16. A computer-implemented method for analyzing characteristics of neural networks, the method comprising:
receiving, via a graphical user interface, a configuration specifying one or more interconnections between a first neural network and a second neural network;
causing the first neural network to generate a first output based on a first input; and
causing the second neural network to generate, based on the one or more interconnections included in the configuration, a natural language expression that conveys to a user at least one of an architectural characteristic or a functional characteristic of the first neural network when generating the first output.

17. The computer-implemented method of claim 16, wherein the second neural network is coupled to an internal portion of the first neural network that performs a first operation to generate the first output, and wherein the natural language expression conveys to the user at least one characteristic of the first operation.

18. The computer-implemented method of claim 16, further comprising outputting the natural language expression to the user via the graphical user interface or storing the natural language expression in memory.

19. The computer-implemented method of claim 16, wherein the one or more interconnections between the first neural network and the second neural network comprise a first interconnection between an intermediate layer of the first neural network and an input layer of the second neural network.

20. The computer-implemented method of claim 16, wherein the configuration further indicates a neural network type associated with the first neural network and a neural network type associated with the second neural network.

* * * * *